United States Patent [19]

Lamberts et al.

[11] Patent Number: 5,602,190
[45] Date of Patent: Feb. 11, 1997

[54] PROCESS FOR THE PRODUCTION OF HARD POLYURETHANE FOAMS

[75] Inventors: Wilhelm Lamberts, Leverkusen; Norbert Eisen, Köln, both of Germany; James Thompson-Colon, Clara, Mexico

[73] Assignees: Bayer Aktiengesellschaft, Leverkusen, Germany; Bayer Corporation, Pittsburgh, Pa.

[21] Appl. No.: 374,708

[22] PCT Filed: Jul. 22, 1993

[86] PCT No.: PCT/EP93/01959

§ 371 Date: Jan. 27, 1995

§ 102(e) Date: Jan. 27, 1995

[87] PCT Pub. No.: WO94/03515

PCT Pub. Date: Feb. 17, 1994

[30] Foreign Application Priority Data

Aug. 4, 1992 [DE] Germany ................... 42 25 760.3

[51] Int. Cl.⁶ ........................................................ C08J 9/08
[52] U.S. Cl. .......................... 521/131; 521/155; 521/163; 521/164; 521/167; 521/170; 521/174
[58] Field of Search ................. 521/131, 155, 521/163, 164, 167, 170, 174

[56] References Cited

U.S. PATENT DOCUMENTS

| | | | |
|---|---|---|---|
| 4,931,482 | 6/1990 | Lamberts et al. | 521/131 |
| 4,972,002 | 11/1990 | Volkert | 521/120 |
| 5,096,933 | 3/1992 | Volkert | 521/131 |
| 5,155,141 | 11/1992 | Deger et al. | 521/131 |
| 5,164,418 | 11/1992 | Behme et al. | 521/131 |
| 5,169,873 | 12/1992 | Behme et al. | 521/114 |

FOREIGN PATENT DOCUMENTS

| | | |
|---|---|---|
| 2000019 | 4/1990 | Canada . |
| 2052227 | 3/1992 | Canada . |
| 477920 | 9/1991 | European Pat. Off. . |
| 1234432 | 9/1989 | Japan . |
| 3231916 | 10/1991 | Japan . |

OTHER PUBLICATIONS

CA: 112(10): 78,784j Dec. 1989.
Derwent Publications Ltd., London, GB; AN 91–344720/47 & JP, A,3 231 916 (Mitsui Toatsu Chem. Inc.) Oct. 15, 1991 (See Abstract).

*Primary Examiner*—James J. Seidleck
*Assistant Examiner*—John M. Cooney, Jr.
*Attorney, Agent, or Firm*—Joseph C. Gil; N. Denise Brown

[57] ABSTRACT

Rigid polyurethane foams are prepared by the reaction of 1) polyisocyanates with 2) compounds of a molecular weight of from 150 to 1500, having at least two hydrogen atoms active towards isocyanates and which one tertiary nitrogen atom in the molecule, in the presence of 3) hydrofluoroalkanes as foaming agents as well as optionally in the presence of 4) other auxiliary substances and additives known per se.

8 Claims, No Drawings

PROCESS FOR THE PRODUCTION OF HARD POLYURETHANE FOAMS

Owing to their outstanding heat insulation properties, rigid polyurethane foams have been employed for many years for the insulation of appliances for cooling and refrigeration, industrial installations, petrol stations, pipelines, in shipbuilding and for numerous insulating functions in the construction industry.

The thermal conductivity of rigid polyurethane foam, which has to a large extent closed cells, is largely dependent on the type of foaming agent or cell gas used. The perhalogenated chlorofluorocarbons (FCKW) have proved to be particularly suitable for this purpose, especially trichlorofluoromethane (R11), which has a particularly low thermal conductivity. The said materials are chemically inert, non-toxic and non-combustible. Owing to their high stability, however, the perhalogenated chlorofluorocarbons enter the stratosphere, where they are thought to contribute to the breakdown of the ozone present there by reason of their chlorine content (for example, Molina, Rowland Mature 249 (1974) 810; First interim report of the Bundestags-Enquete-Kommission "Vorsorge zum Schutz der Erdatmosphäre" [Bundestag Commission of Enquiry, "Provisions for Protection of the Earth's Atmosphere"] dated 02.11.1988, Deutscher Bundestag, Referat Öffentlichkeitsarbeit, Bonn).

The use of partly fluorinated hydrocarbons (hydrofluoroalkanes), which retain at least one carbon-hydrogen bond, as foaming agents has already been proposed (see, for example, EP-PS 344 537, U.S. Pat. No. 4,931,482).

Substances of the said class of compounds contain no chlorine atoms and consequently have an ODP value (Ozone Depletion Potential) of zero. (In comparison: R11: ODP=1)

Typical representatives of this class of substances are, for example, 1,1,1,4,4,4-hexafluorobutane (R356) or 1,1,1,2-tetrafluoroethane (R134a).

Furthermore, the use as foaming agents of hydrocarbons such as n- or i-pentane, 2,2-dimethylbutane, cyclopentane or cyclohexane is known.

Owing to their chemical structure, partly fluorinated and pure, that is, unsubstituted, hydrocarbons are highly non-polar and so do not mix well with the polyols conventionally used for producing rigid foam. However, this is an important prerequisite for the conventional technique of production, wherein the polyol and isocyanate components are mechanically mixed with one another.

In addition to the reactive polyether polyol or polyester polyol, the polyol components also contain the foaming agent and the auxiliary substances such as activators, emulsifiers and stabilisers in dissolved form. The polyol component is thus a one-phase mixture.

When the partly fluorinated or pure hydrocarbons are used in the equimolar substitution of conventional foaming agents such as, for example, R11, in commercially available formulations, their low solubility leads to the formation of two phases which cannot be processed further by conventional methods.

The object of the present invention was to employ a polyol component wherein the solubility of the partly fluorinated and pure hydrocarbons is increased, so that they are present as a one-phase mixture in the polyol component.

Surprisingly, it has been found that the solubility of partly fluorinated and pure alkanes is sharply increased in polyols which contain a tertiary nitrogen atom.

The invention provides the use of 1. compounds of a molecular weight of from 150 to 1500, having at least two hydrogen atoms active towards isocyanates and which contain one tertiary nitrogen atom in the molecule, for increasing the solubility of hydrofluoroalkanes and/or pure hydrocarbons in the polyol component during the production of rigid polyurethane foams by reaction with 2. polyisocyanates in the presence of 3. hydrofluoroalkanes and/or pure hydrocarbons as foaming agents as well as optionally in the presence of 4. other auxiliary substances and additives known per se.

The following are used for the production of the rigid polyurethane foams:

1. Compounds having at least two hydrogen atoms reactive towards isocyanates and a molecule weight as a rule of from 150 to 1500, which contain one tertiary nitrogen atom in the molecule ("polyol component"). These are understood to include, apart from compounds containing amino groups, thiol groups or carboxyl groups, preferably compounds containing hydroxyl groups, particularly compounds containing from 2 to 8 hydroxyl groups, especially those of a molecular weight of from 200 to 1200, preferably 250 to 500, for example, such polyethers and polyesters having at least 2, preferably 2 to 6 hydroxyl groups, which are known per se.

According to the invention polyethers which have a molecular weight of from 250 to 500 are preferred.

Especially preferred are polyethers which have been obtained by reacting triethanolamine or ethylenediamine with ethylene oxide and/or propylene oxide.

According to the invention, a proportion (up to 50% by weight, referred to component 2) of other compounds having at least two hydrogen atoms reactive towards isocyanates and a molecular weight of from 62 to 10 000, such as the polyethers and polyesters known per se as well as chain extenders and wetting agents (cf. DE-OS 2 832 253, pages 11 to 20) can be used concomitantly.

Other starting components for the production of the rigid polyurethane foams are:

2. aliphatic, cycloaliphatic, araliphatic, aromatic and heterocyclic polyisocyanates which are described, for example, by W. Siefken in Justus Liebigs Annalen der Chemie, 562, pages 75 to 136, for example those of the formula Q(NCO)n, wherein n signifies 2 to 4, preferably 2 to 3, and Q is an aliphatic hydrocarbon radical having 2 to 18, preferably 6 to 10 C atoms, a cycloaliphatic hydrocarbon radical having 4 to 15, preferably 5 to 10 C atoms, an aromatic hydrocarbon radical having 6 to 15, preferably 6 to 13 C atoms or an araliphatic hydrocarbon radical having 8 to 15, preferably 8 to 13 C atoms, for example, polyisocyanates such as are described in DE-OS 2 832 253, pages 10 to 11.

As a rule the technically readily accessible polyisocyanates are particularly preferred, for example, 2,4- and 2,6- tolylene diisocyanate and any mixtures of the said isomers ("TDI"), polyphenyl polymethylene polyisocyanates, which are prepared by aniline-formaldehyde condensation and subsequent phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates which are derived from 2,4- and/or 2,6- tolylene diisocyanate or from 4,4'- and/or 2,4'- diphenylmethane diisocyanate.

3. Volatile partly fluorinated hydrocarbons (hydrofluoroalkanes) are employed as foaming agents, preferably 1,1,1,4,4,4-hexafluorobutane (R356), 1,1,1,2-tetrafluoroethane (R134a) and/or 1,1,1,2,3,3,3-heptafluoropropane (R227).

Pure hydrocarbons, preferably n- or i-pentane or cyclopentane, are moreover used as foaming agents.

Water and/or other volatile organic compounds can be used as additional foaming agents.

4. Optionally other auxiliary substances and additives known per se are used concomitantly, such as catalysts, emulsifiers, flameproofing agents, and foam stabilisers.

Emulsifiers based on alkoxylated fatty acids and higher alcohols are preferred. Polyether siloxanes, especially water-soluble representatives, are mainly suitable as foam stabilisers. The said compounds are generally structured in such a way that a copolymer of ethylene oxide and propylene oxide is bonded with a polydimethylsiloxane radical. Such foam stabilisers are described, for example, in U.S. Pat. Nos. 2,834,748, 2,917,480 and 3,629,308. The catalysts known per se from polyurethane chemistry, such as tertiary amine and/or organometallic compounds, may be used concomitantly.

Tricresyl phosphate may be named as an example of a flame retardant.

Reaction retarding agents, for example, acid reacting substances such as hydrochloric acid or organic acid halides, also cell regulators of a type known per se, such as paraffins or fatty alcohols or dimethyl-polysiloxanes, as well as pigments or dyes, also stabilisers against the influences of ageing and weathering, softeners and fungistatic and bacteriostatic substances as well as fillers such as barium sulphate, kieselguhr, carbon black or whitening, may also be used concomitantly.

Further examples of surface-active additives and foam stabilisers, cell regulators, reaction retarding agents, stabilisers, flame retardants, softeners, dyes and fillers as well as fungistatic and bacteriostatic substances to be used concomitantly optionally according to the invention, together with particulars concerning the method of application and mechanism of action of the said additives, are described in Kunststoff-Handbuch, Volume VII, published by Vieweg and Höchtlen, Carl-Hanser-Verlag, Munich 1966, for example, on pages 103 to 113.

CARRYING OUT OF THE INVENTION

The reaction components are reacted according to the invention by the known per se one-step process, prepolymer process or semiprepolymer process, with mechanical equipment frequently being employed, for example, that described in U.S. Pat. No. 2,764,565. Particulars of processing equipment which is also suitable according to the invention are given in Kunststoff-Handbuch, Volume VII, published by Vieweg and Höchtlen, Carl-Hanser-Verlag, Munich 1966, for example, on pages 121 to 205.

According to the invention the process is carried out within the characteristic range of from 100 to 300, preferably 100 to 130.

In the course of the foam production, according to the invention foaming may also be carried out in closed moulds. In this case the reaction mixture is placed into a mould. Suitable mould materials are metals, for example, aluminium, or plastics, for example, epoxy resin.

The foamable reaction mixture expands in the mould and forms the composite. The foaming in the mould may be carried out so that the surface of the moulded product has a cellular structure. However, it may also be carried out so that the moulded product has a solid skin and a cellular core. According to the invention, in this connection it is possible to proceed so that the quantity of foamable reaction mixture placed in the mould is such that the foam developed just fills the mould. It is also possible to operate so that more of the foamable reaction mixture is placed into the mould than is required to fill the interior of the mould with foam. In the latter case the operation is thus carried out with "overcharging"; such a method of procedure is known, for example, from U.S. Pat. Nos. 3,178,490 and 3,182,104.

"External foaming agents" known per se, such as silicone oils, are very often used for foaming in the mould. However, so-called "internal foaming agents", optionally mixed with external foaming agents, can also be used; these are disclosed, for example, in DE-OS 2 121 670 and 2 307 589.

Preferably cooling and refrigerating equipment are foamed according to the invention.

However, foams can, of course, also be produced by block foaming or according to the known per se twin conveyor belt process.

In addition the rigid foams which can be obtained according to the invention are used, for example, in the building trade and for the insulation of long distance pipes and of containers.

EXAMPLES 1,1,1,4,4,4,-hexafluorobutane or cyclopentane is added to 100 g of a polyol mixture consisting of basic polyol, activator, stabiliser and water until a phase separation is detected. This quantity is designated as the limiting concentration for the solubility in the respective polyol mixture.

The polyol mixtures in the examples each consist of 95 g of basic polyol, 1 g of activator (dimethylcyclohexylamine), 2 g of stabiliser B 8421 (Goldschmidt AG) and 2 g of water.

| | |
|---|---|
| Polyol 1: (comparison) | Polyol based on sucrose, propylene glycol, water and propylene oxide having an average molecular weight of 850 |
| Polyol 2: (comparison) | Polyol based on trimethylolpropane and propylene oxide having an average molecular weight of 440 |
| Polyol 3: (comparison) | Polyol based on sorbitol, propylene glycol and propylene oxide having an average molecular weight of 750 |
| Polyol 4: (comparison) | Polyester polyol based on phthalic anhydride, sorbitol, diethylene glycol and ethylene oxide having an average molecular weight of 650 |
| Polyol 5: (invention) | Polyol based on ethylenediamine and propylene oxide having an average molecular weight of 480 |
| Polyol 6: (invention) | Polyol based on ethylenediamine and propylene oxide having an average molecular weight of 360 |
| Polyol 7: (invention) | Polyol based on triethanolamine and propylene oxide having an average molecular weight of 1,100 |

Solubility of 1,1,1,4,4,4-hexafluorobutane [g] (A) and cyclopentane [g] (B)

| | A | B |
|---|---|---|
| Polyol 1 | 11 | 6 |
| Polyol 2 | 18 | 13 |
| Polyol 3 | 9 | 2 |
| Polyol 4 | 9 | 4 |
| Polyol 5 | 29 | >30 |
| Polyol 6 | 24 | >30 |
| Polyol 7 | 27 | >30 |

The Examples 5 to 7 according to the invention show that the quantities of 1,1,1,4,4,4-hexafluorobutane and cyclopentane soluble in the polyol could be significantly increased as compared with the comparison Examples 1 to 4.

The higher the quantities of foaming agent soluble in the polyol, the higher is the proportion of the foaming agent in the cell gas of the rigid foam produced therefrom and at the same time the smaller is the thermal conductivity.

We claim:

1. A process for the production of hard polyurethane foams by reacting 1) compounds having molecular weights of from 150 to 1500, having at least two hydrogen atoms that are reactive with isocyanate groups, and having one tertiary nitrogen atom in the molecule, with
   2) polyisocyanates in the presence of 3) foaming agents consisting essentially of one or more pure hydrocarbons, and, optionally, 4) other auxiliary substances and additives.

2. The process of claim 1, wherein component 1) comprises a polyether having a molecular weight of from 250 to 500.

3. The process of claim 1, wherein component 1) is a polyether which has been obtained by reacting triethanolamine with propylene oxide and/or ethylene oxide.

4. The process of claim 1, wherein component 1) is a polyether which has been obtained by reacting ethylenediamine with propylene oxide and/or ethylene oxide.

5. The process of claim 1, wherein said foaming agent comprises cyclopentane.

6. The process of claim 1, wherein said foaming agent is selected from the group consisting of n-pentane, isopentane, and mixtures thereof.

7. The process of claim 1, wherein said foaming agent comprises 2,2-dimethylbutane.

8. The process of claim 1, wherein said foaming agent comprises a mixture of n-pentane, isopentane, and/or cyclopentane.

* * * * *